United States Patent [19]

Nürk

[11] 4,312,195
[45] Jan. 26, 1982

[54] DUST-COLLECTING SYSTEM FOR CIRCULAR KNITTING MACHINE

[75] Inventor: Siegfried Nürk, Albstadt, Fed. Rep. of Germany

[73] Assignee: Firma Sipra Patententwicklungs u. Beteiligungsgesellschaft mbH, Stuttgart, Fed. Rep. of Germany

[21] Appl. No.: 67,162

[22] Filed: Aug. 16, 1979

[30] Foreign Application Priority Data

Sep. 1, 1978 [DE] Fed. Rep. of Germany ....... 2838178

[51] Int. Cl.³ ............................................. D04B 35/32
[52] U.S. Cl. ..................................... 66/168; 308/4 R; 308/200
[58] Field of Search .......................... 66/168; 139/1 C; 308/4 R, 200

[56] References Cited

U.S. PATENT DOCUMENTS

| | | | |
|---|---|---|---|
| 1,752,207 | 3/1930 | Seifert | 66/168 |
| 2,724,624 | 11/1955 | Barr | 308/200 |
| 3,039,834 | 6/1962 | Howe | 308/4 R |
| 3,422,640 | 1/1969 | Abrams | 66/168 |
| 3,535,895 | 10/1970 | Krauss | 66/168 |
| 3,549,223 | 12/1970 | Minick et al. | 308/200 |
| 3,783,648 | 1/1974 | Heinrichs | 66/168 |
| 4,141,607 | 2/1979 | Traut | 308/200 |

FOREIGN PATENT DOCUMENTS

| | | | |
|---|---|---|---|
| 809355 | 4/1969 | Canada | 139/1 C |
| 34664 | 5/1970 | German Democratic Rep. | 66/168 |

*Primary Examiner*—Wm. Carter Reynolds
*Attorney, Agent, or Firm*—Michael J. Striker

[57] ABSTRACT

A circular knitting machine has a needle cylinder and loop-forming instrumentalities which form loops along an annular loop-forming zone. A plurality of suction nozzles orbit about the annular loop-forming zone collecting dust and fluff therefrom. The suction nozzles are mounted on a rotating, annular, upper part of a channel-defining housing which rides on a stationary, annular lower housing part, the rotating and stationary housing parts together defining a suction channel with which the suction nozzles communicate, the suction channel being connected to a suction source. The annular channel-defining housing encircles the needle cylinder and is located radially outwards of and lower than the annular loop-forming zone of the circular knitting machine, the suction nozzles extending upwards from the annular rotating housing part to the annular loop-forming zone, with their ends being provided with suction openings which are located radially outwards of and facing the annular loop-forming zone.

14 Claims, 11 Drawing Figures

FIG. 3a

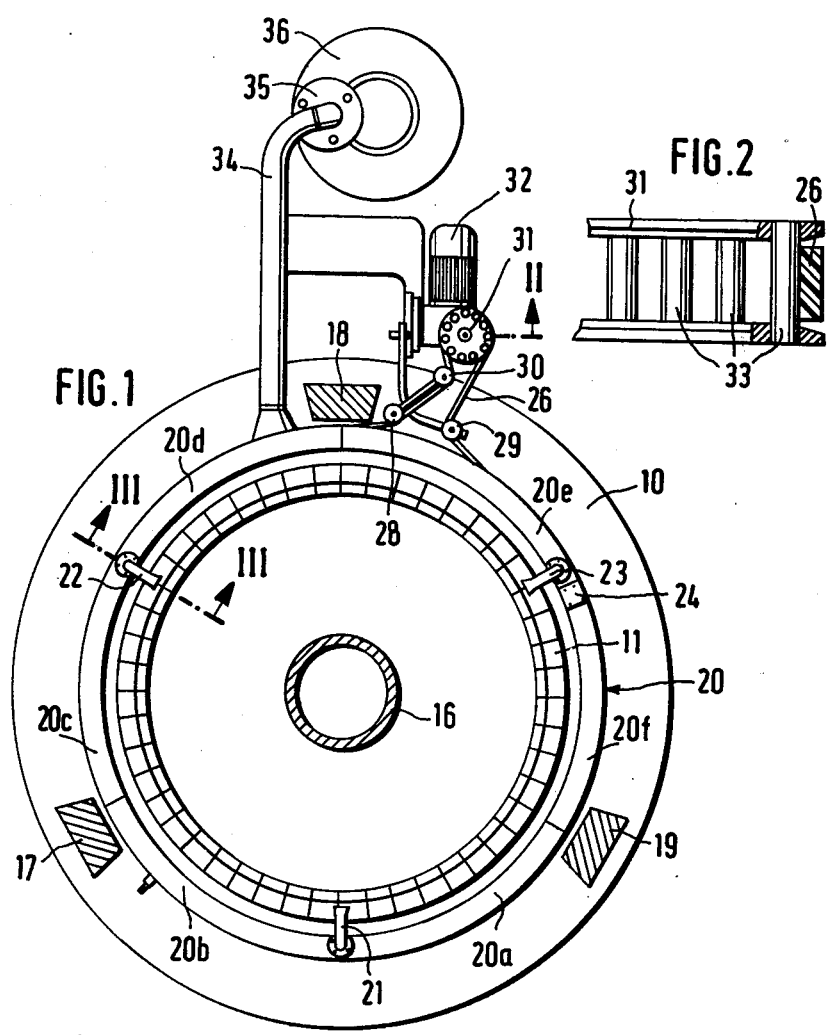

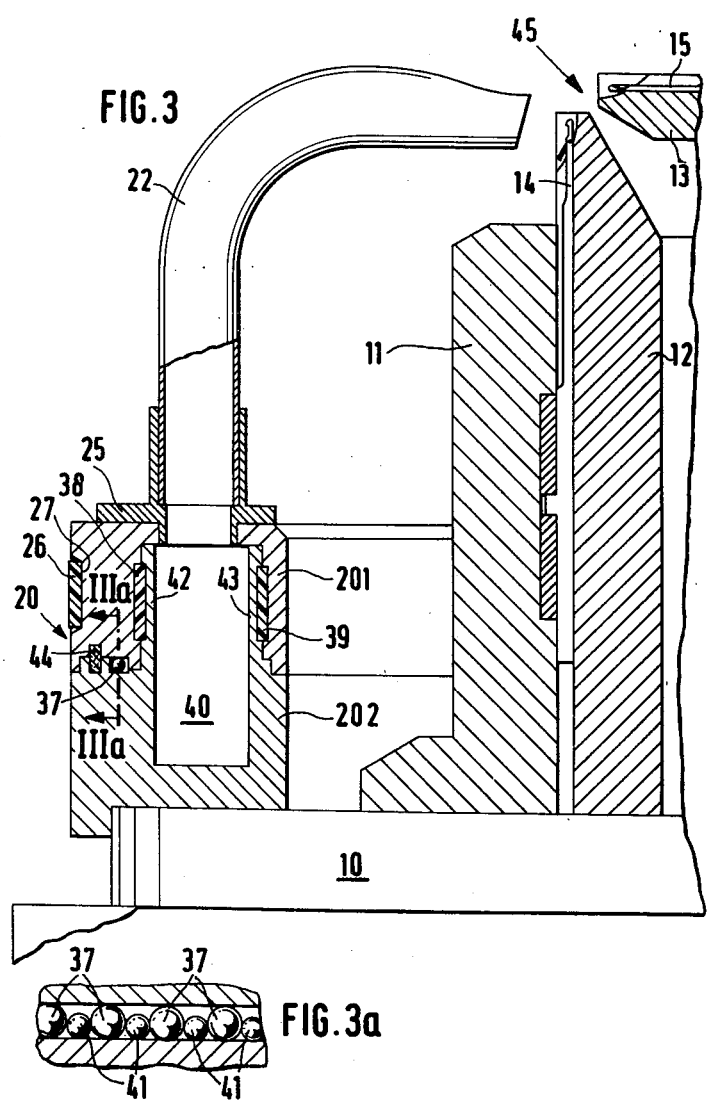

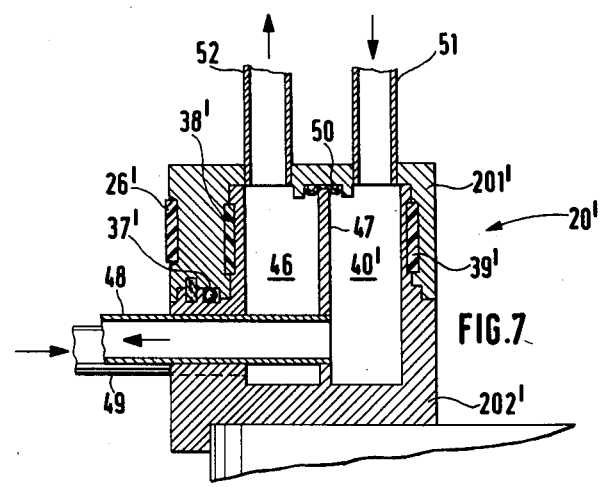
FIG.7.
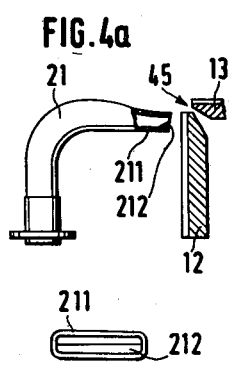
FIG.4a
FIG.4b
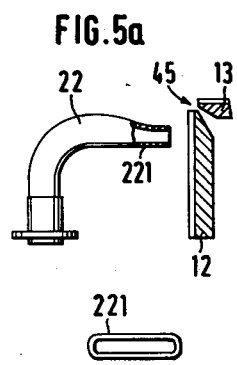
FIG.5a
FIG.5b
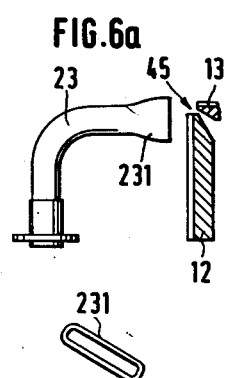
FIG.6a
FIG.6b

DUST-COLLECTING SYSTEM FOR CIRCULAR KNITTING MACHINE

BACKGROUND OF THE INVENTION

The present invention concerns dust-collecting systems for circular knitting machines, of the type comprising at least one suction nozzle mounted to travel in an orbit coaxial with the needle cylinder of the machine and collect dust and fluff from the annular loop-forming zone of the circular knitting machine.

German Democratic Republic Pat. No. 34,664 of Jan. 15, 1965 discloses such a dust-collection system, in which an annular channel-defining housing coaxial with the needle cylinder defines an annular suction channel connected to a suction source. Part of the channel-defining housing rotates under the action of a drive mechanism and mounts the dust-collecting suction nozzles. In that conventional system, the annular channel-defining housing is located vertically higher than the annular loop-forming zone of the circular knitting machine; the suction nozzles extend downwardly from the annular channel-defining housing towards the loop-forming zone and accordingly suck dust and fluff upwards into the annular suction channel of the housing.

With such a conventional system, the location of the annular channel-defining housing vertically above the annular loop-forming zone, with the suction nozzles extending downwards from the housing to the loop-forming zone, has the effect of interfering with the yarn-feeding systems of the machine and interfering with access to the yarn-feeding systems of the machine. The dust-collecting system, due to its location and configuration, additionally interferes with freedom of access to the loop-forming instrumentalities and cam system of the machine. Additionally, in that type of system, the rotating part of the channel-defining housing rides on exposed rollers, and the rotating part of the channel-defining housing is driven by a drive gear relative to which it cannot slip.

SUMMARY OF THE INVENTION

It is a general object of the invention to provide a dust-collection system of the general type outlined above, in which the dust-collecting members of the system orbit at a speed independent of the machine operating speed, but so configured that the system operate reliably and effectively without intefering with operation of or access to the loop-forming instrumentalities and cam systems of the machine.

In accordance with the present invention, the annular channel-defining housing encircles the needle cylinder and is located radially outwards of and lower than the annular loop-forming zone of the circular knitting machine. The annular channel-defining housing comprises an annular stationary housing part and an annular rotating housing part engaging with each other to form an annular suction channel connected to a source of suction. A plurality of suction nozzles are mounted on the annular rotating housing part and communicate with the suction channel, the suction nozzles extending upwards from the annular rotating housing part to the annular loop-forming zone of the machine and have at their ends suction openings which are located radially outwards of and facing the annular loop-forming zone.

Advantageously, the rotating housing part of the suction-channel-defining housing rides atop the the stationary housing part through the intermediary of an annulus of spherical bearing members, with the annular suction channel internal to the housing sealed from the exterior of the housing by means of at least one annular sealing member.

The locations and orientations of the annular channel-defining housing and of the suction nozzles avoids interference with servicing of components of the circular knitting machine.

Having the rotating part of the housing ride atop the stationary housing part makes unnecessary the use of external supporting members, e.g., the exposed support rollers of the prior art, which could be subject to accumulations of dust and fluff.

The inventive dust-collecting system is of such a configuration that, furthermore, it can be feasibly installed on most any existing circular knitting machine of conventional design. To this end, it is advantageous that the annular channel-defining housing be constituted by a circumferential succession of connected together sectors which can be assembled in place around the needle cylinder of the machine.

Reliable operation of the dust-collecting system—principally, proper orbiting of the dust-collecting nozzles around the annular loop-forming zone—is assured by the manner in which the rotating housing part is mounted. Advantageously, the upper, rotating housing part is provided with two annular, downwardly extending wall portions, and the lower, stationary housing part with two, upwardly extending wall portions, the downwardly extending wall portions interfitting down onto the upwardly extending wall portions, with the upwardly extending wall portions of the stationary housing part confined between the downwardly extending wall portions of the rotating housing part.

Advantageously, antifriction bearing bands are accommodated between the facing surfaces of each downwardly extending wall portion and the associated upwardly extending wall portion. Such bearing bands serve to properly engage the rotating and stationary housing parts with each other for relative movement with low friction between them, and additionally contribute to sealing the internal, annular suction channel from the ambient atmosphere exterior to the channel-defining housing. The antifriction bearing bands can be made of low-friction synthetic plastic material, such as polytetrafluoroethylene.

Interference as between relatively moving components resulting from the presence of the orbiting suction nozzles of the dust-collection system in front of the cam system of the machine does not arise in the preferred embodiment, in which a drive belt which drives the rotating housing part is permitted to slip upon development of any overload situation. The rotating housing part can, therefore, be readily stopped by hand. Advantageously, use is not made of a separate slip coupling or overload clutch; instead, it suffices that the drive belt be driven by a drive drum having a low effective surface area, the drive drum being of squirrel-cage configuration and comprised of a circumferential succession of cylindrical bars around which the drive belt passes. Upon development of an overload situation, the drive belt can slip relative to the bars of the squirrel-cage drive drum.

In an alternative embodiment of the invention, the interior of the annular channel-defining housing is subdivided to form both the aforementioned suction channel and additionally a pressure channel, the latter connected to a pressure source. The rotating part of the housing then mounts both suction nozzles and also pressure nozzles, the latter located to loosen accumulating dust and fluff for capture by the suction nozzles.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a highly schematic horizontal section through a circular knitting machine provided with the inventive dust-collecting system, the section plane being at the elevation of the loop-forming zone of the machine;

FIG. 2 is a partly sectioned view of the squirrel-cage drive drum for the dust-collecting system, the partial section being taken as indicated at II in FIG. 1;

FIG. 3 is a vertical section taken along line III—III of FIG. 1;

FIG. 3a is a section taken along line IIIa—IIIa of FIG. 3;

FIGS. 4a, 5a and 6a depict the shapes and locations of three different suction nozzles of the system, relative to the loop-forming zone of the machine;

FIGS. 4b, 5b and 6b depict the mouths of the suction nozzles of FIGS. 4a–6a, depicting their orientations relative to the horizontal and their differing effective areas; and FIG. 7 is a cross-section, similar to part of FIG. 3, through an alternative embodiment of the inventive dust-collecting system.

DESCRIPTION OF THE PREFERRED EMBODIMENTS

In FIG. 1 there is depicted, of the framework of a circular knitting machine, the machine's lower mounting ring 10 which supports the machine's annular cam system 11 (see also FIG. 3). The rotating needle cylinder 12 and the rotating dial 13 with the cylinder needles 14 and the dial needles 15 are not depicted in FIG. 1 but are shown in FIGS. 3 and 4. However, FIG. 1 depicts a central shaft 16 as well as three external supports 17, 18, 19 of the machine's framework, shown in section.

Located radially outwards of and coaxial with the annular cam system 11 is a channel-defining housing 20 comprised of a stationary part and a rotating part, as will be described with reference to FIG. 3. As shown in FIG. 1, channel-defining housing 20 is composed of six individual sectors 20a–20f. At each of the junctions between sectors 20a and 20b, between sectors 20c and 20d, and between sectors 20e and 20f, there is mounted a respective one of three suction nozzles 21, 22 and 23. Additionally, near the junction between sectors 20e and 20f, the channel-defining housing 20 is provided with an access door, whose purpose is described below. As shown in FIG. 3, each of suction nozzles 21, 22, 23 is inserted into a respective flanged sleeve 25, the flanged sleeve additionally serving to establish a junction between the respective two adjoining sectors of channel-defining housing 20.

In FIG. 1, numeral 26 denotes a drive belt which, as shown in FIG. 3, is received within a groove 27 in the outer peripheral surface of channel-defining housing 20.

As shown in FIG. 1, at a particular angular position about the circular knitting machine, the drive belt 26 is fed away from housing 20 via two guide rollers 28, 29 and a tensioning roller 30 around a drive drum 31. Drive drum 31 is driven by its own electric motor 32 independently of the drive motor for the knitting machine itself, and is preferably an adjustable-speed motor. Drive drum 31 is of squirrel-cage configuration, its belt-engaging surface portions being constituted by a circumferential succession of spaced cylindrical bars 33, as shown in FIG. 2. Drive belt 26 engages the succession of cylindrical bars 33 in mere tangency therewith, resulting in a small surface area for actual frictional force transmission to the drive belt. In this way if an overload situation develops, the belt 26 can slip with respect to drive drum 31.

As shown in FIG. 3, channel-defining housing 20 defines an internal channel 40 which, as shown in FIG. 1, communicates via a pipe 34 with a schematically depicted suction-generating blower 36 through the intermediary of a filter unit 35. Suction-generating blower 36 establishes within channel 40 (FIG. 3) an underpressure producing a suction inflow through the suction nozzles 21, 22, 23. As the three suction nozzles 21, 22, 23 orbit about the circular knitting machine, the dust particles and fuzz sucked in by nozzles 21, 22, 23 are caught in filter unit 35.

FIG. 3 depicts the construction of the channel housing 20. Annular channel-defining housing 20 comprises a lower and stationary annular part 202 secured to the carrier ring 10 of the machine and an upper rotating annular part 201. These upper and lower housing parts 201, 202 interfit to form the annular channel 40. Rotating, upper housing part 201 is supported and positioned on stationary, lower housing part 202, through the intermediary of an annulus of spherical bearings 37 and additionally through the intermediary of two anti-friction bearing bands 38 and 39. As shown in FIG. 3a, the spherical bearings 37, preferably made of steel, alternate with smaller-diameter spherical members 41, preferably made of plastic, which latter serve to space the steel bearings 37 one from the next. The two anti-friction bearing bands 38, 39 are made of very low friction synthetic plastic material such as polytetrafluoroethylene. Each of the two bands 38, 39 is accommodated in a respective annular space, in part defined by a circumferential groove in upper, rotating housing part 201 and in part defined by a circumferential groove in lower, stationary housing part 202. These two annular spaces, which accommodate the respective anti-friction bearing bands 38, 39, are accessible from the exterior of the channel-defining housing 20, at the access door 24 (FIG. 1) provided near the junction between housing sectors 20e and 20f. When access door 24 is opened, each bearing band 38, 39 can be drawn out of the housing and replaced by pushing a new band into the aforementioned two annular spaces through the open access door 24. In order to be able to provide this form of bearing action, the lower, stationary housing part 202 is provided with two upwardly projecting annular walls 42, 43, down onto which the upper, rotating housing part 201 is pushed and fitted into place. The outer peripheral surface of upper housing part 201 is provided with the circumferential groove 27, already mentioned, for drive belt 26.

In order to shield the races for the spherical bearings 37 and the spherical members 41 against dirt and dust, a felt ring 44 is accommodated in an annular groove in the upper face of stationary housing part 202, radially outward of the annulus of bearings 37. Felt ring 44 is secured to stationary housing part 202 but projects upwards into a correspondingly located annular groove in the underface of rotating housing part 201. Additionally, the facing and engaging cylindrical surfaces of the upper and lower housing parts 201, 202 are of complementary, stepped cross-sectional configuration, as shown in FIG. 3; this contributes to sealing of annular suction channel 40 from ambient air.

The orbiting suction nozzles 21, 22, 23 are secured to the rotating housing part 201 by means of the flanged sleeves 25 already mentioned. As shown in FIGS. 4a–6a, each of the three suction nozzles is differently located with respect to the machine's actual loop-forming zone 45. Suction nozzle 21 has its mouth 211 facing radially inwards towards the lower edge of the gap between the needle cylinder 12 and dial 13, down through which the tubular fabric is pulled for collection. The mouth 211 of suction nozzle 21 is provided with an insert 212 (see also FIG. 4b) which serves to restrict the mouth of suction nozzle 21 to a narrow horizontal slot which extends along the upper edge of the mouth of the nozzle.

As shown in FIGS. 5a and 5b, the second suction nozzle 22 has a horizontally oriented nozzle opening 221 located vertically lower than that of first suction nozzle 21, so as to suck dust more directly from the needle-trick region of needle cylinder 12. Also, because of the lack of an insert member such as insert 212 of nozzle 21, the nozzle opening 221 of second suction nozzle 22 is of larger effective cross-sectional area.

As shown in FIGS. 6a and 6b, the nozzle opening 231 of third suction nozzle 23 is oriented inclined relative to the horizontal, so as to sweep across a zone at the vicinity of loop-forming region 45 which extends from vertically lower than the mouths of suction nozzles 21, 22 to vertically higher than the mouths of suction nozzles 21, 22.

In this way, the three differently located and oriented suction nozzles effect an intensive removal from all locations in the loop-forming zone of the machine on which dust and fluff could deposit and could interfere with needle-cylinder rotation and the catching of yarn by the machine's needles. The intensity of the dust-removal action can be varied to take into account the particular characteristics of the yarn employed by varying the rotary speed of the upper, rotating housing part 201 of channel-defining housing 20, thereby varying the speed with which the suction nozzles 21, 22, 23 mounted on housing part 201 orbit around the machine.

FIG. 7 is a sectional view through a modified channel-defining housing 20′ of another exemplary embodiment of the inventive dust-collection system. In this embodiment, use is made of a suction-generating blower as in the embodiment already described, but additionally use is made of a pressure-generating blower. The annular channel-defining housing 20′ comprises an annular suction chamber 40′ but additionally an annular pressure chamber 46. (Instead of using both a suction-generating blower and a pressure-generating blower, use could instead be made of a single blower whose discharge side provides the requisite pressure and whose suction side provides the requisite suction.) The lower, stationary part 202′ of annular channel-defining housing 20′ is provided with an annular, upwardly extending intermediate wall 47, which separates the annular suction chamber 40′ from the annular pressure chamber 46. Annular suction chamber 40′ is connected via a connector pipe 48 to the suction-generating blower of the system; the annular pressure chamber 46 is connected via a connector pipe 49 to the pressure-generating blower employed.

The upper, rotating part 201′ of channel-defining housing 20′ is, as in the construction depicted in FIG. 3, mounted on the lower, stationary housing part 202′ through the intermediary of steel spherical bearings 37′ and anti-friction bearing bands 38′ and 39′, and is rotated by a drive band 26′ entrained about the outer periphery of upper housing part 201′. The annular suction chamber 40′ and the annular pressure chamber 46 are sealed off from each other by means of a profiled antifriction bearing band 50 located at the upper end of the annular intermediate wall 47 of the lower, stationary housing part 202′, the profiled anti-friction band 50 being accommodated in an annular recess in the upper, stationary housing part 201′.

The upper, rotating housing part 201′ mounts and carries a plurality of suction nozzles 51, and additionally mounted a plurality of pressure nozzles 52. The mouths of the suction nozzles 51 and pressure nozzles 52 are so located in front of the loop-forming zone of the knitting machine that the dust and fluff blown free by the pressure nozzles 52 are sucked in and collected by the suction nozzles 51.

It will be understood that each of the elements described above, or two or more together, may also find a useful application in other types of constructions differing from the types described above.

While the invention has been illustrated and described as embodied in dust-collection systems provided on circular knitted machines of particular design, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a circular knitting machine having a needle cylinder and loop-forming instrumentalities operative for forming loops along an annular loop-forming zone, in combination, an annular channel-defining housing encircling the needle cylinder and located radially outwards of and lower than the annular loop-forming zone of the circular knitting machine, the annular channel-defining housing comprising an annular stationary housing part and an annular rotating housing part engaging with each other to form an annular suction channel, a source of suction connected to the suction channel, a plurality of suction nozzles mounted on the annular rotating housing part and communicating with the suction channel, the suction nozzles extending upwards from the annular rotating housing part to the annular loop-forming zone and having at their ends suction openings which are located radially outwards of and face the annular loop-forming zone, the annular rotating housing part being located on top of and riding on the annular stationary housing part, a drive belt entrained about the radially outer peripheral surface of the annular rotating housing part, a drive drum of squirrel-cage configuration comprised of a succession of bars, and guide rollers guiding the drive belt towards and away from the outer peripheral surface of the rotating housing part and around the drive drum.

2. In a circular knitting machine as defined in claim 1, the suction openings of different ones of the plurality of suction nozzles being differently configured.

3. In a circular knitting machine as defined in claim 1, the suction openings of different ones of the plurality of suction nozzles being differently located relative to the loop-forming zone.

4. In a circular knitting machine as defined in claim 1, the suction openings of different ones of the plurality of suction nozzles differing with respect to configuration and location relative to the loop-forming zone.

5. In a circular knitting machine as defined in claim 1, the annular channel-defining housing defining in addition to the annular suction channel an annular pressure channel separate from the suction channel, and furthermore comprising a plurality of pressure nozzles mounted on the rotating housing part and communicating with the annular pressure channel.

6. In a circular knitting machine as defined in claim 1, the stationary housing part and the rotating housing part comprising annular portions of complementary and multiply stepped cross-sectional configuration, the complementary multiply stepped annular portions of the stationary and rotating housing parts interfitting with each other.

7. In a circular knitting machine as defined in claim 1, the rotating housing part riding on the stationary housing part through the intermediary of an annulus of spherical bearing members.

8. In a circular knitting machine as defined in claim 7, furthermore including at least one annular sealing member intermediate the rotating and stationary housing parts and serving to seal the annular suction channel from ambient air exterior to the annular channel-defining housing.

9. In a circular knitting machine as defined in claim 7, the annulus of spherical bearing members comprising a succession of steel ball bearings alternating with spherical members of synthetic plastic of diameter smaller than the steel ball bearings.

10. In a circular knitting machine as defined in claim 7, furthermore including an annular sealing member located in the vicinity of the annulus of spherical bearing members, the annular sealing member being anchored in one of the housing parts and sliding in sealing engagement against the other of the housing parts.

11. In a circular knitting machine as defined in claim 1, the lower, stationary housing part comprising two radially spaced, upwardly extending annular wall portions, the upper, rotating housing part comprising two radially spaced, downwardly extending annular wall portions interfitting with said downwardly extending annular wall portions and being confined intermediate the downwardly extending annular wall portions.

12. In a circular knitting machine as defined in claim 11, wherein said interfitting downwardly and upwardly extending annular wall portions define facing cylindrical surfaces, and furthermore including antifriction bearing bands confined intermediate the facing cylindrical surfaces.

13. In a circular knitting machine as defined in claim 12, the facing cylindrical surfaces of respective ones of the interfitting downwardly and upwardly extending annular wall portions being provided with complementary annular recesses, each antifriction bearing band being accommodated in the annular space formed by the annular recess in a respective upwardly extending annular wall portion and the complementary recess in the respective downwardly extending annular wall portion.

14. In a circular knitting machine as defined in claim 13, the annular channel-defining housing including an access passage for insertion and removal of the antifriction bearing bands from the exterior of the channel-defining housing.

* * * * *